United States Patent [19]

Mahr et al.

[11] 4,144,902
[45] Mar. 20, 1979

[54] ISOLATION VALVE

[75] Inventors: René N. Mahr, Howald-Hesperange; Pierre H. Mailliet, Howald, both of Luxembourg

[73] Assignee: S.A. des Anciens Etablissements Paul Wurth, Luxembourg, Luxembourg

[21] Appl. No.: 737,173

[22] Filed: Nov. 1, 1976

[30] Foreign Application Priority Data

Nov. 11, 1975 [LU] Luxembourg ............................ 73780

[51] Int. Cl.² .............................................. F16K 3/36
[52] U.S. Cl. .................................. 137/246.22; 137/340; 137/248; 251/58; 251/60; 251/90; 251/228; 251/298
[58] Field of Search .................... 251/58, 60, 89, 90, 251/228, 298; 137/246.22, 248, 340

[56] References Cited

U.S. PATENT DOCUMENTS

| 674,297 | 5/1901 | Kosiol | 137/248 X |
| 1,664,963 | 4/1928 | Atwell | 177/248 |
| 1,826,941 | 10/1931 | LaMont | 251/58 X |
| 2,999,666 | 9/1961 | Sjogren | 251/228 X |
| 3,410,422 | 11/1968 | Carpentier | 251/228 X |
| 3,521,659 | 7/1970 | Seger | 251/298X |
| 3,589,670 | 6/1971 | Armstrong | 251/58 |
| 3,724,809 | 4/1973 | Reale | 251/298 X |
| 3,727,880 | 4/1973 | Stock | 251/58 X |
| 3,831,622 | 8/1974 | Grewer | 137/340 |
| 3,980,270 | 9/1976 | Thomas | 251/89 X |

Primary Examiner—Harold W. Weakley

[57] ABSTRACT

A gas generator, for example a blast furnace, is isolated from an exhaust gas treatment system by means of an isolation valve characterized by a valve housing which may be permanently installed in the gas delivery conduit. The housing has a laterally offset recess which receives the valve member when in the open position and the valve member may define a liquid receiving vessel in the interest of establishing a liquid barrier between the interior of the conduit and the valve seat when the valve is closed. The valve is preferably hydraulically operated and the actuator is mounted so as to minimize loading on the control shaft bearings.

35 Claims, 9 Drawing Figures

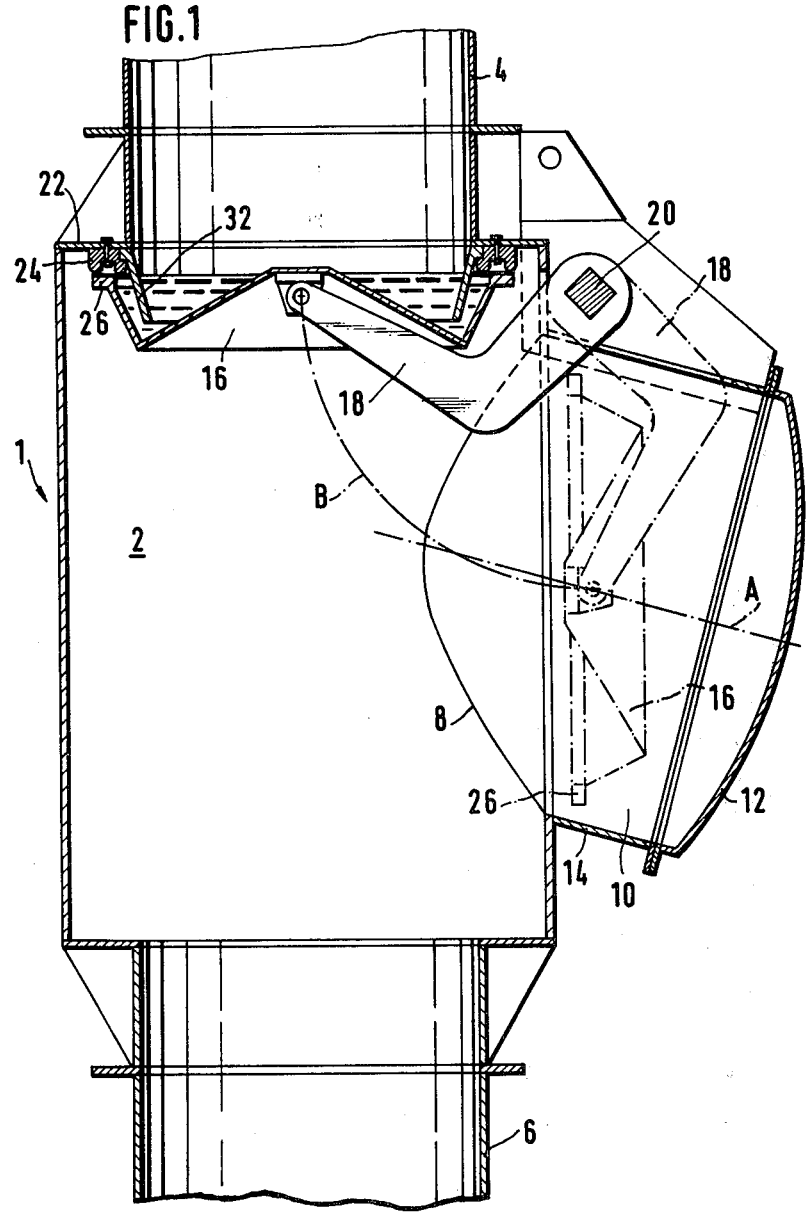

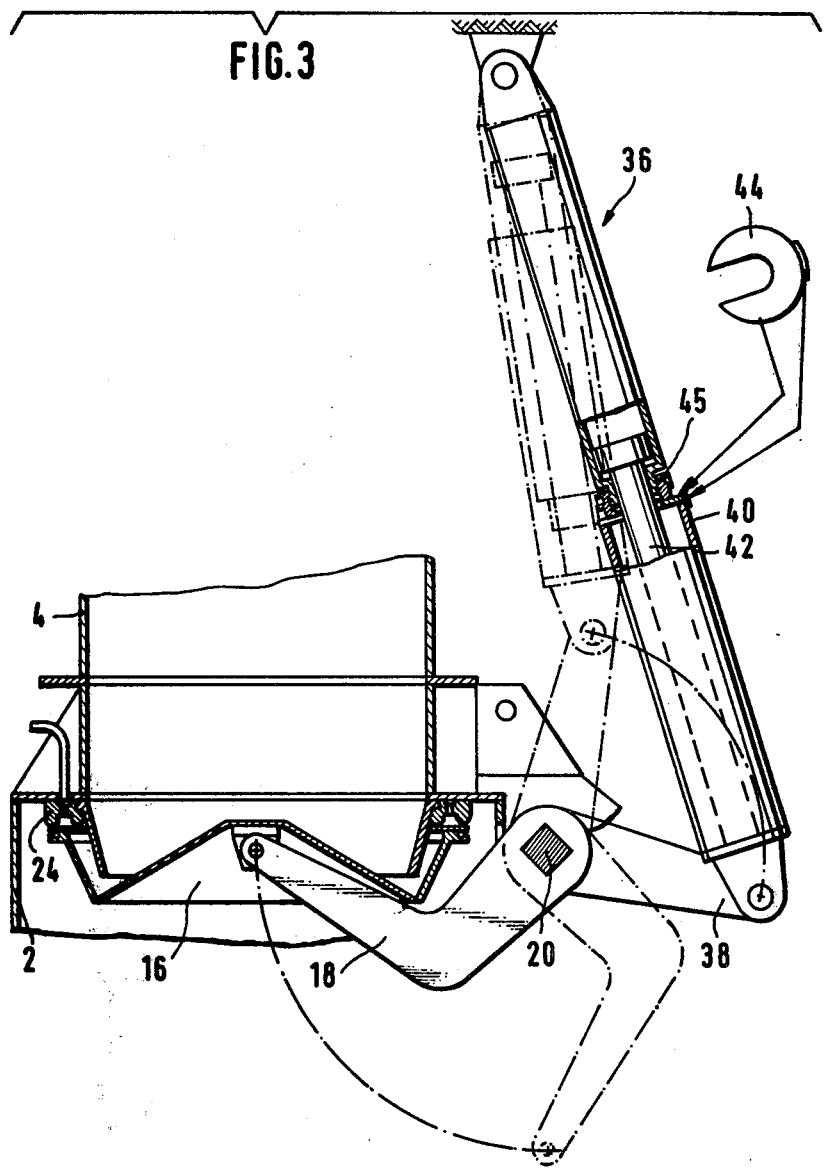

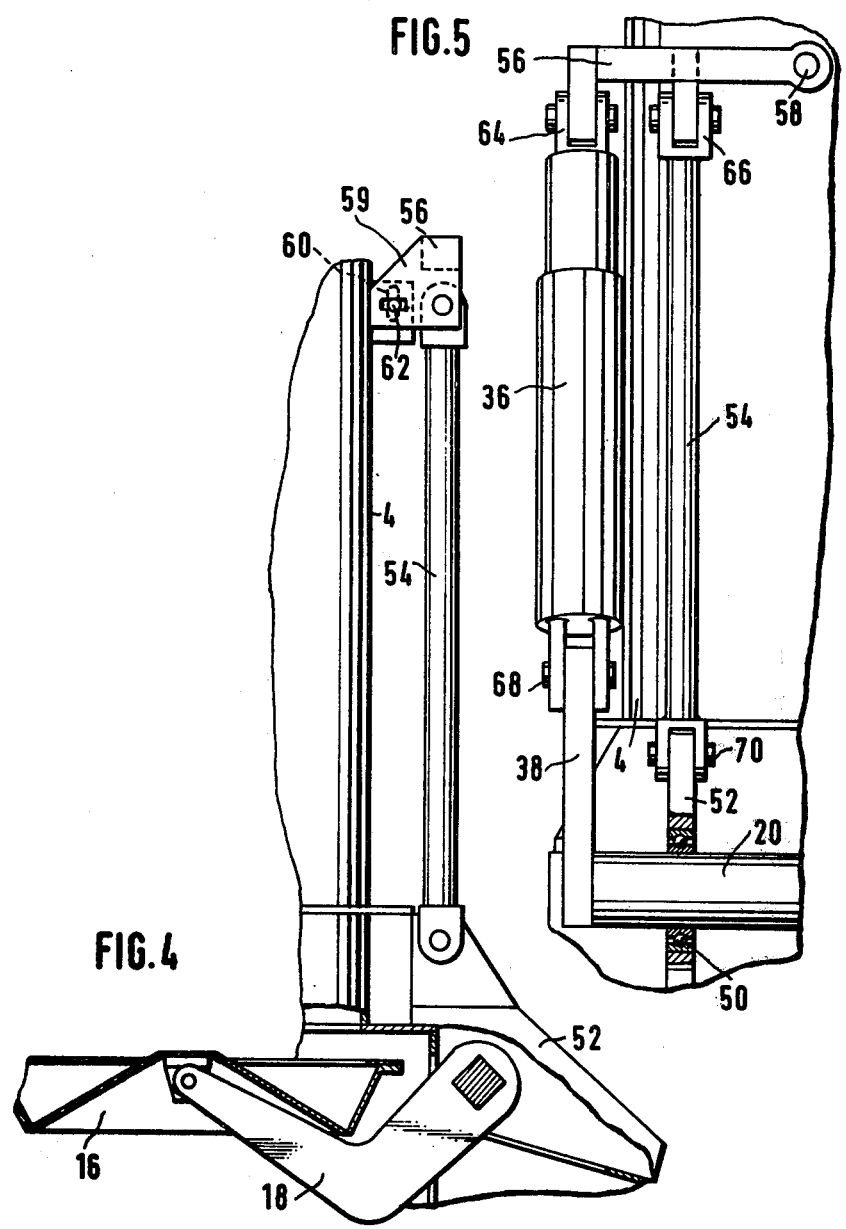

ISOLATION VALVE

BACKGROUND OF THE INVENTION (1) Field of the Invention

The present invention relates to the exercise of control over the flow of pressurized gases, particularly high temperature gases with entrained particulate matter such as are discharged from reduction furnaces. More specifically, the present invention is directed to valving apparatus especially suited for installation in large diameter collector pipes through which exhaust gases from the throat of a blast furnace are discharged. Accordingly, the general objects of the present invention are to provide novel and improved methods and apparatus of such character.

(2) Description of the Prior Art

While not limited thereto in its utility, the present invention is particularly well suited for use in the environment of a shaft furnace of the type employed for the reduction of iron ore. The invention and the state of the art will thus be discussed in terms of controlling the discharge of exhaust gases from a blast furnace. As is well known, modern blast furnaces operate at high temperatures and pressures and emit, via collector pipes coupled to the upper or throat regions thereof, a combustible mixture of gases, steam and entrained dust particles. The crude gases released from the blast furnace via the collector pipe is subjected to purification, cooling and expansion prior to being delivered to a gas supply system.

The particulate laden mixture of gases released from a blast furnace is generally exhausted through a plurality of evacuation pipes arranged around the furnace throat. These evacuation pipes are coupled to a common collector conduit which extends downwardly from the top of the furnace to a primary dust-removal apparatus. The primary dust-removal apparatus will typically include dry filtration equipment which removes some of the solid particles entrained in the crude furnace gases. The primary dust-removal apparatus must be serviced relatively frequently and the shutting down of the furnace in order to clean or replace the filtration devices in the dust-removal apparatus would be economically prohibitive. Accordingly, means must be provided to isolate the interior of the blast furnace from the primary dust-removal equipment and other gas purification apparatus situated downstream thereof. The isolation equipment will commonly take the form of a shutter or valve installed in the collector conduit upstream of the primary dust-removal apparatus.

The collector conduit valve or shutter must, in the interests of safety and economic operation, fulfill a plurality of conditions. Firstly, it should enable the blast furnace to be rapidly isolated from the treatment system in which the crude gases are purified. While the isolation need not be absolutely hermetic with respect to the portion of the collector conduit located downstream of the shutter, it must be completely free of any leakage to the exterior of the collector conduit; this need for hermetic sealing to the outside environment being particularly necessary when the furnace is operated with high throat counterpressure. Additionally, in order to permit the servicing of the primary dust-removal apparatus and any other apparatus located downstream thereof, the collector conduit shutter or valve must provide a hermetic seal with respect to the interior of the furnace; i.e., the collector conduit must be completely "interrupted" in a manner which will insure that there is no leakage of the high pressure and high temperature furnace exhaust gases past the valve.

At the present time there are no valve devices suitable for installation in blast furnace collector conduits which fulfill all of the above outlined conditions. Additionally, all presently available blast furnace collector conduit "shutters" suffer from the serious drawback of requiring a very complicated and expensive superstructure. In accordance with present designs, maintenance operations on collector conduit valves usually require that the entire valve be dismantled. Since a blast furnace collector conduit isolation valve may weigh as much as several dozen tons, it is necessary to construct a very firm gangway around the valve and to provide a suitable support device for the upper part of the collector conduit which will be left with its downstream end hanging free if the valve has to be dismantled. These physical support problems are complicated by the fact that the collector conduit isolation valve will be situated above the primary dust-removal apparatus and will thus typically be positioned several dozen meters above the ground.

SUMMARY OF THE INVENTION

The present invention overcomes the above briefly discussed and other deficiencies and disadvantages of the prior art by providing a novel and improved method of and apparatus for closing fluid flow passages of large cross-sectional area. Apparatus in accordance with the present invention is particularly well suited for use as a collector conduit isolation valve for controlling the flow of exhaust gases exiting a blast furnace. A valve in accordance with the present invention is rugged, easy to operate and service and fully hermetic with respect to both the ambient atmosphere around the collector pipe and the interior of the furnace. Additionally, the valve in accordance with the present invention is characterized by sealing surfaces which are not directly impinged upon by the particulate laden furnace exhaust gases when in the open condition. Further, a valve in accordance with the present invention does not require any superstructure for supporting the portion of the collector conduit upstream thereof.

The valve of this invention is characterized by at least a first valve member or flap which is pivotally mounted in a valve housing which forms an integral part of the collector conduit. The valve housing is provided with at least a first lateral chamber and the valve member may be pivoted between a collector conduit sealing position and an open position in which the valve member occupies the lateral chamber.

The present valve is also characterized by a novel actuator for the valve member control shaft; the control shaft passing through a wall of the valve housing. The actuator, in accordance with a preferred embodiment, comprises a hydraulic jack which is mechanically latched with the valve in the closed position whereby a hydraulic system leak will not result in a closed valve moving to the open position under the influence of pressurized gas upstream thereof or gravity.

Collector conduit isolation valves in accordance with the present invention are also characterized by a unique sealing arrangement which, in spite of the harsh operating environment, insures that the closure established by the valve will be absolutely hermetic over a long service life. This hermetic sealing is accomplished through the use of a valve seat which is preferably U-shaped and through use of a deformable sealing ring which will be sandwiched between the valve seat and a projection on the valve member. The valve seat may also be fluid cooled and the valve member may be shaped so as to receive and hold a bath which, in cooperation with a projection which extends in the downstream direction from the upstream collector conduit section, may be used to establish a liquid seal which prevents the crude furnace gas from reaching the mechanical seal.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 is a cross-sectional side elevation view of a first embodiment of a valve in accordance with the present invention;

FIG. 3 is a side elevation view, partially in section, of an actuator mechanism for the valve of FIG. 1;

FIGS. 4, 5 and 6 are schematic illustrations of the means for suspending and actuating the valve of FIG. 1.

DESCRIPTION OF THE PREFERRED EMBODIMENT

Figure 1A:
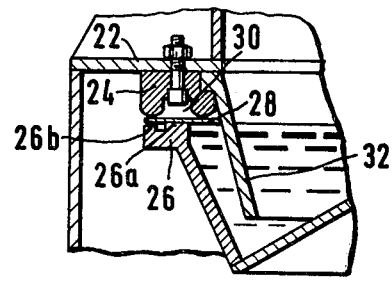
FIG. 1a is a partial view, on an enlarged scale, of the sealing surfaces of the valve of FIG. 1.

With reference now to the drawing, and particularly FIG. 1, a "shutter" or valve in accordance with the present invention is indicated generally at 1. The valve includes a housing or box 2 which forms part of the collector conduit through which gases, for example crude blast furnace exhaust gases, are conveyed. In the environment of a blast furnace, valve 1 will be positioned upstream of a primary dust-removal apparatus. The housing 2 is bolted or welded to both the upstream portion 4 of the collector conduit and the downstream collector conduit 6 so as to define an integral assembly.

The housing 2 is provided, at one side thereof, with an angularly offset extension 14 which defines a lateral chamber 10. Access to chamber 10 is via an entrance aperture which has been indicated at 8. The conduit section or extension 14 is welded to the wall of housing 2. A removable cover 12 is provided to afford access to the interior of chamber 10 for the purpose of servicing the valve or dismantling the sealing flap or valve member 16. For reasons which will be discussed in greater detail below, the axis A of chamber 10 intersects the axis of housing 2 at other than a right angle.

The sealing flap 16 of a valve in accordance with the embodiment of FIG. 1 has been shown in full lines in the closed position and in broken lines in the open position. In the open position flap 16 is, as noted, received in chamber 10. Sealing flap 16 is mounted on the first end of an elbow or lever 18. The second end of lever 18 is connected to a rotatable control shaft 20. The means by which shaft 20 may be rotated, thus causing sealing flap 16 to pivot between the open and closed conditions, will be described below in the discussion of FIGS. 3–6.

Referring jointly to FIGS. 1 and 1a, housing 2 is provided with an inwardly extending rim 22 about its upper end. A valve seat member 24 is attached, by means of bolts in the disclosed embodiment, to rim 22. Member 24 will typically define a circular valve seat which cooperates, in the manner to be described below, with a generally ring-shaped sealing surface 26 on flap 16. As depicted in FIGS. 1, 1a and 3, valve seat member 24 has the general shape of an inverted U. In order to enhance the hermeticity of the valve, a sealing ring 28 may be provided between seat 24 and sealing surface 26. Sealing ring 28 will span the gap between the two legs of U-shaped seat member 24 and will, when the valve closes, undergo a slight flexure between the legs of the seal. The flexing of ring 28 results from the pressure exerted thereon by projection 26a of sealing surface 26 on flap 16. The bending action of sealing ring 28 will be limited by a further projection 26b on sealing surface 26; projection 26a extending toward the valve seat a greater distance than projection 26b. The sealing ring 28 serves the added function of compensating for any thermal deformations of either the valve seat or the sealing surface on the valve flap.

When the valve is in the closed position, the legs of the U-shaped seat member 24 cooperate with either the sealing ring 28 or the projection 26a to define an annular chamber 30. In accordance with a preferred embodiment of the invention an inert gas, such as nitrogen, or steam is injected into chamber 30 at a pressure above that of the crude gas in upstream conduit section 4. The injection of a pressurized fluid into chamber 30 functions to cool the sealing surfaces and effectively cleans the seat defining member 24 and the surface of sealing ring 28 and/or the sealing ring 26 on valve flap 16 during the closing of the flap. Additionally, the fluid injected into chamber 30 enhances the sealing of the valve if its pressure is above that existing within conduit 4 thus improving the hermeticity of the joint as a result of the counterpressure. The means for injecting fluid into chamber 30 has been omitted from FIGS. 1 and 1a in the interest of facilitating understanding of the invention but is shown schematically in FIG. 3.

Valve flap 16 presents, in the upstream direction, a surface which, in cross-section, is generally in the form of a W; i.e., valve flap 16 presents an annular "dish" to upstream conduit portion 4. When valve flap 16 is in the closed position this annular dish can be advantageously filled with water, via a pipe not shown in the drawing, thus enabling the hermeticity of the valve to be further improved. A downwardly angled frustoconical plate 32, which is affixed to rim 22 of housing 2, will extend into the annular dish defined by flap 16 so as to be partly immersed in the water when the valve is in the closed position; this condition being depicted in FIG. 1. Accordingly, water contained in the annular dish will prevent the crude furnace gas from reaching the sealing surfaces of the valve when it is in the closed position.

Flap 16 will be moved into lateral chamber 10 when the valve is in the open condition and will, when in the chamber, be easily accessible for maintenance purposes merely by removing cover 12. Similarly, the lever 18 and control shaft 20 may be dismantled without difficulty. The arrangement of the present invention, wherein housing 2 forms part of the collector conduit, offers a considerable advantage when compared to the prior art where the valve was a separate unit which, when dismantling was necessary, left the lower end of upper collector conduit portion 4 hanging freely thereby necessitating the provision of extremely cumbersome supporting devices to hold the collector conduit in position upstream of the valve. These supporting devices were, it should be noted, necessary during dismantling and also when the valve was installed since the prior art valves were unable to support all of the forces resulting from the weight of the upper collector conduit and any expansions which the conduit might undergo. Accordingly, as has been noted above, it has been customary and necessary in the prior art to provide a complicated and robust superstructure above the primary dust-removal apparatus to support the collector conduit between the isolation valve and the top of the blast furnace. This complicated superstructure included a very strong access gangway, extending about the periphery of the valve assembly, which enabled maintenance operations to be performed. In accordance with the present invention a gangway of much lighter weight may be provided since parts of the valve assembly may be individually removed without the necessity of forming a discontinuity in the collector conduit.

Continuing with the discussion above, in accordance with the present invention a portion of the crude gas collector conduit is designed as a valve housing and provided with the necessary apparatus to prevent the passage of gases when it is desired to isolate downstream apparatus from the interior of the furnace. Thus, when employing the present invention, it is no longer necessary to provide any special support for the upper part of the collector conduit and the superstructure of the collector conduit installation is considerably simplified; i.e., at most it is necessary to provide only a lightweight access gangway which permits the servicing of the valve of the present invention through the removable cover 12. Thus, any superstructure required in accordance with the present invention need only be sufficient to support the weight of maintenance personnel and the heaviest single component of the collector conduit isolation valve.

As discussed briefly above, conduit extension 14 defines a chamber 10 having an axis A which intersects the longitudinal axis of the collector conduit. In accordance with the present invention the angle between these two axes is preferably in the range of 75°-80°. This angular relationship between chamber 10 and the conduit is in the interest of minimizing the diameter of both housing 2 and chamber 10; an approximate 5% reduction in the diameter of the housing being achieved. In view of the fact that the diameter of a typical collector conduit may be on the order of three meters, a 5% reduction in size saves considerable space and weight.

The diameters of housing 2 and chamber 10 must, of course, be selected such that the valve flap 16 can be rotated into and out of housing 2 via the entrance aperture 8 of chamber 10; entrance aperture 8 being defined by the intersection of the wall of housing 2 and conduit extension 14. The width of the entrance aperture 8 must, at every level, be greater than the corresponding diameter of flap 16. The widest portion of the entrance aperture 8 must, accordingly, be as close as possible to the trajectory of that portion of the movable valve member having maximum width; i.e., the trajectory of the center of flap 16; if the dimensions of housing 2 are to be minimized. This condition is fulfilled if the extension 14 is inclined with respect to housing 2 so that the trajectory B of the center of flap 16 does not vary by any appreciable distance from the axis A of chamber 10 when the valve flap enters the extension 14 via the entrance aperture 8.

Figure 2:
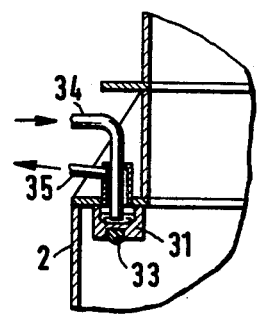
FIGS. 2 and 2a schematically represent an alternative sealing arrangement for the valve of FIG. 1.
Figure 2A:
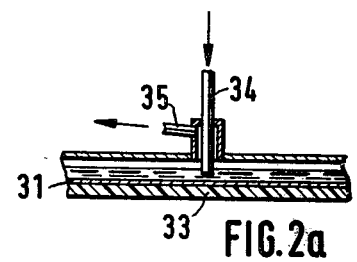

Turning now to FIGS. 2 and 2a, an alternate valve seat construction for use with the present invention is shown schematically. In FIGS. 2 and 2a the valve seat member, indicated at 31, is provided with a resilient sealing ring 33. In order to prevent the temperature of seat 31 or ring 33 from becoming excessive, seat 31 is of hollow construction as may best be seen from FIG. 2a. The interior of seat 31 communicates, via conduits 34 and 35, with a source of cooling fluid whereby coolant, such as inert gas or water, may be caused to circulate within the valve seat.

A mechanism for actuating the valve flap 16 is depicted in FIG. 3. This mechanism comprises a hydraulic jack 36 pivotally mounted to the exterior of housing 2. The valve control shaft 20 is rotated, by jack 36, via a lever 38. As the apparatus is shown in the drawing, the extended condition of jack 36, corresponding to the closed position of the valve, is shown in full lines while the retracted condition of jack 36, corresponding to the open position of the valve, is shown schematically in broken lines.

The output or piston rod 42 of the hydraulic jack 36 is surrounded by a protective casing 40 which extends over essentially the entire length of the rod and moves therewith. Casing 40 is of greater diameter than the outer diameter of the cylinder of hydraulic jack 36 and is coaxial therewith. With the hydraulic jack in the retracted position, a major portion of the cylinder body of jack 36 will be positioned within casing 40 as shown in broken lines in FIG. 3. The protective casing 40 performs the multiple functions of protecting the polished surface of rod 42 and, when in the retracted position, the cylinder of the hydraulic jack itself. Additionally, casing 40 serves as a component of a mechanical locking mechanism for retaining the valve in the closed position. The locking function is performed in cooperation with a generally horseshoe shaped locking member 44. The locking member 44, with jack 36 in the extended position and thus valve flap 16 closed, is inserted between the end of protective casing 42 and the cylinder of jack 36. In this position member 44 prevents casing 40 from moving toward the cylinder of hydraulic jack 36 and thus prevents piston rod 42 from being retracted into the cylinder. Accordingly, should there be a hydraulic system failure, for example an accidental leakage of hydraulic fluid, the valve flap 16 will not open if locking member 44 is in place between casing 40 and the cylinder of jack 36.

The head of hydraulic jack 36 may be provided with an exterior thread which is engaged by an adjusting nut 45. In actual practice, because of manufacturing tolerances and slight deformations in the various components of the system which transmits motion to the valve flap 16, particularly in the levers 18 and 38, a slight clearance may be left between the locking member 44 and the head of the cylinder of hydraulic jack 36 and also between the locking member 44 and the end of protective casing 40. Any clearance which exists may be taken up by adjusting nut 45 and, thereafter, the pressure in jack 36 may be relieved and the valve will remain in the closed position solely as a result of the locking action of member 44. The adjusting nut 45 may, in the alternative, form a part of locking member 44.

Figure 6:
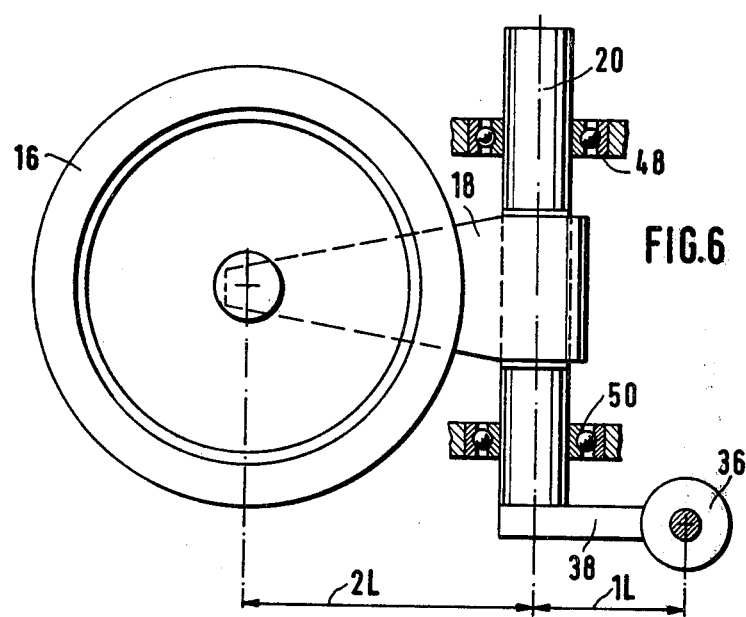

FIGS. 4, 5 and 6 are respectively a schematic lateral view, a schematic front view and a schematic horizontal section view of the means for mounting the control mechanism, including hydraulic jack 36, for valve flap 16. Thus, considering FIG. 6, the valve flap 16, actuated via the lever 18 which is connected to the rotatable control shaft 20, is shown schematically. Rotatable shaft 20 is supported by bearings 48 and 50 with that portion of shaft 20 situated between the bearings being located within the lateral chamber 10. It will be understood that suitable packings, not shown in the drawing, will be provided about the control shaft 20 where it penetrates the walls of conduit extension 14 in order to render the valve device hermetic with respect to the ambient atmosphere. The control shaft 20, to the exterior of chamber 10, is integral with the lever 38.

The force or output power which must be provided by hydraulic jack 36 is a function of the force with which valve flap 16 is applied against the valve seat 24 and the length ratio between the levers 18 and 38 which transmit the movements of the hydraulic jack to the flap. The force with which flap 16 must be held against valve seat 24 depends on the pressure of the crude gas within conduit portion 4 and on the cross-sectional area of the conduit 4. With a force of thirty tons acting on the flap, this being exemplary of the operating conditions encountered in modern high-performance blast furnaces, the length ratio between levers 38 and 18 (1L/2L) is inherently unfavorable since the length of lever 38 (1L) is limited by the manner in which the control mechanism is positioned and arranged. The best length ratio obtainable for levers 38 and 18 is approximately 1:2 so that hydraulic jack 36 will have to exert a force of sixty tons on lever 38 if a closing force of thirty tons, for example, is to be applied to flap 16. If a closing force of thirty tons is applied to flap 16 the flap will, in turn, undergo a force of thirty tons as a reaction from the valve seat; the latter reaction being in the same direction as the force of sixty tons applied by jack 36 to lever 38. This results in the control shaft 20, which undergoes the sum of applied forces, being subjected to a thrust of ninety tons in a downward direction when valve flap 16 is in the closed position. This force or weight must be supported in its entirety by the bearings of control shaft 20 and particularly by bearing 50 which is at the side of the shaft to which the actuating force is applied. Accordingly, bearing 50 must be mounted in such a manner so as to enable it to withstand a thrust of at least ninety tons under the exemplary conditions being discussed.

In accordance with the present invention an antagonistic force; i.e., a tractional force which will tend to compensate for the thrust to which bearing 50 is subjected; is applied to this bearing as a result of the reaction of jack 36 itself. Thus, as shown schematically in FIGS. 4 and 5, bearing 50 is mounted in a support plate 52. Plate 52 is attached, for example by welding, to the upper part of valve housing 2. Support plate 52 is connected, by means of an intermediate rod 54, to a lever arm 56 from which the hydraulic jack 36 is suspended; the jack 36 having been omitted from FIG. 4 in order to avoid concealing the connection between the lever arm 56 and the bearing support plate 52. The lever arm 56 is attached to the upstream portion 4 of the collector conduit by means of a pivot connection 58 such that arm 56 may be moved in a plane which is tangential to conduit portion 4. Lever arm 56 is also coupled to the exterior of conduit portion 4 by means of a shoe 59 having a vertical slot 60 provided therein. A tenon 62, integral with the wall of conduit 4, passes through slot 60. The above described arrangement limits the vertical pivoting of lever arm 56 to a few centimeters and completely restrains arm 56 from horizontal movement. The hydraulic jack 36 and the intermediate rod 54 are respectively suspended, by means of couplings 64 and 66 as shown in FIG. 5, from lever arm 56. The opposite ends of jack 36 and rod 54 are respectively connected, via respective couplings 68 and 70, to lever 38 and the bearing support plate 52.

When jack 36 is actuated in order to close valve 16, equal forces are exerted at the opposite ends thereof. Thus, again by way of example, if the jack exerts a thrust of sixty tons on lever 38 it will also exert a thrust of sixty tons on the lever arm 56. The force of sixty tons applied to lever arm 56, after being multiplied in accordance with the length ratio of the sets of levers, is transmitted in its entirely to bearing 50 via rod 54 and support plate 52. Restated, bearing 50 is subjected to a thrust moment from jack 36, via control shaft 20, and a tractional moment via rod 54 and support plate 52. As noted above, the thrust to which bearing 50 is subjected is greater than the force of jack 36 owing to the unfavorable ratio of the lengths of levers 38 and 18 and also because of the addition of the action of jack 36 and the reaction of the valve seat. The magnitude of the tractional force applied to bearing 50, resulting from the reaction of jack 36, is a function of the length ratios of the levers by which the tractional force is transmitted; i.e., the ratio between the length of lever arm 56 and the distance between rod 54 and pivot 58. In accordance with the present invention this length ratio is selected to insure that compensation will be provided for the unfavorable length ratio of lever 38 to lever 18. Again considering the exemplary operating environment discussed above, if a thrust of sixty tons is exerted by jack 36 on lever arm 56, a tractional force of ninety tons must be applied to rod 54. Since the force ratio is 3:2, the intermediate rod 54 will be connected to lever arm 56 at a point located two-thirds of the distance between pivot 58 and coupling 64. With the thrust on bearing 50, when flap 16 is in the closed position, substantially counterbalanced by the tractional force imparted to the bearing, no force is transmitted by bearing 50 to housing 2. This condition is essential to avoid deformation of valve seat 24 and the packings about control shaft 20.

The elongated slot 60, as should be obvious from the discussion above, enables lever arm 56 to undergo a slight pivoting movement thereby counteracting manufacturing tolerances and permitting any thermal expansion which may be caused by the high temperature of the gas passing through the collector conduit.

It will be understood that the actuator mechanism for valve flap 16 could employ a pair of hydraulic jacks, with associated intermediate rods, arranged symmetrically with respect to the midpoint of control shaft 20. While the employment of a pair of jacks results in a control mechanism which is somewhat more complicated and thus more difficult to assemble, it has the advantage of distributing the forces and stresses in a desirable manner and also permitting the use of less powerful hydraulic jacks.

Flap 16 of the isolation valve of the present invention experiences very little wear, thus requiring little maintenance, and any repair which becomes necessary is facilitated by the fact that flap 16 is easily accessible and can be dismantled without difficulty. The limited wear experienced by flap 16 results, to a large measure, from the fact that the sealing surfaces 26, as depicted in FIG. 1a, are not subject to direct impingement by the particle laden gas which passes through the collector conduit when the valve is open. Thus, any erosion which may occur will take place only during the opening and closing of the valve and, as noted above, in accordance with a preferred embodiment the sealing surfaces 26 will be "washed" immediately prior to closing of the valve.

Figure 7:
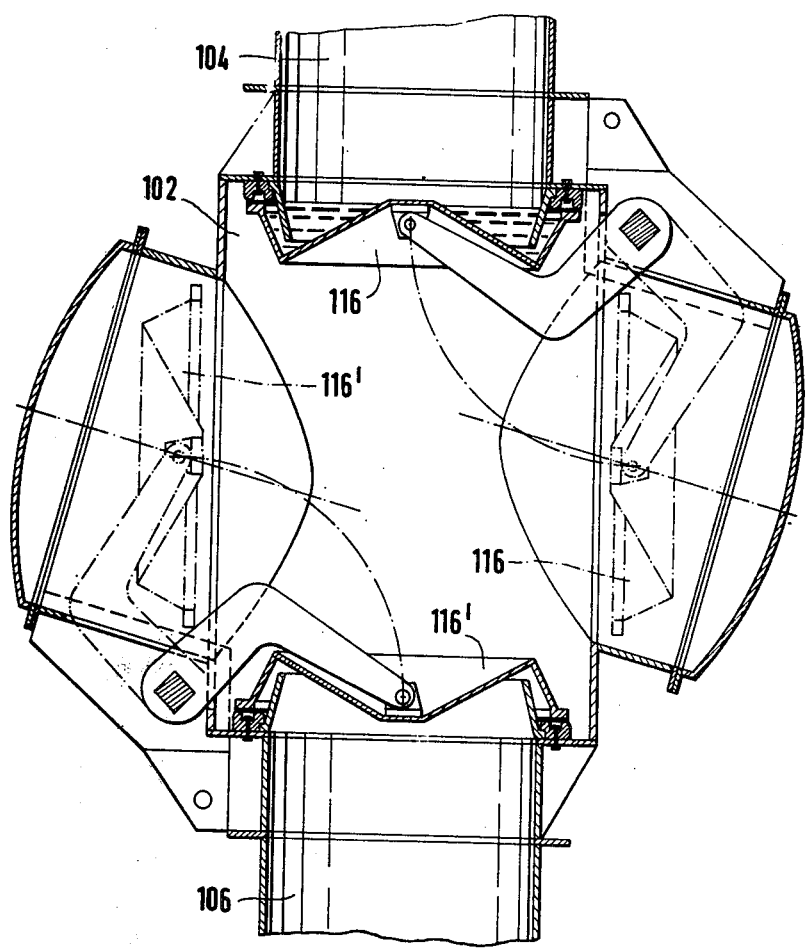
FIG. 7 is a cross-sectional side elevation view, with the actuators omitted, of a valving arrangement in accordance with the present invention which employs a pair of serially arranged valve members.

Referring now to FIG. 7, an isolation valve in accordance with the present invention and employing a pair of flaps 116 and 116' is depicted. The dual isolation valve of FIG. 7 employs a single valve housing 102 which, as in the case of the above described embodiments, is rigidly connected to and forms a part of the collector conduit 104, 106. Valve flaps 116 and 116' are arranged symmetrically with respect to one another. The utilization of a pair of serially arranged isolation valves satisfies the most rigorous safety requirements since upstream valve 116 serves to close the collector conduit from the upstream direction while the lower valve 116' isolates the interior of housing 102 from the downstream equipment; i.e., the arrangement of FIG. 7 permits the interior of valve housing 102 to be totally isolated from both the furnace and the exhaust gas treatment system. Valve flaps 116 and 116' may be mounted and controlled in the manner described above in the discussion of FIGS. 1-6. The valve housing 102 of the FIG. 7 embodiment will include a ventilating port, not shown, which enables the interior of the housing to be completely ventilated after flaps 116 and 116' have been closed and before maintenance personnel remove the covers to perform any necessary maintenance and repair operations.

The flow control technique of the present invention, whether implemented in accordance with the embodiments of FIGS. 1-6 or FIG. 7, fulfills the essential safety and operating conditions mentioned above. The interaction between valve seat 24 and the cooperating sealing ring 26 on the valve member, as well as the employment of a sealing ring 28, permits the furnace or other gas generator to be isolated from a downstream gas treatment system rapidly and efficiently. The technique of the present invention also insures that the isolation, and particularly the isolation between the interior of the valve assembly housing and the ambient atmosphere, will be hermetic even when the gas traversing the conduit in which the valve of the present invention is installed is at a very high pressure. The provision of a liquid bath upstream of the actual sealing surfaces of the valve aids in insuring that the interruption of flow through the conduit in which the valve assembly is installed will be complete.

While a preferred embodiment has been shown and described, various modifications and substitutions may be made thereto without departing from the spirit and scope of the invention. Thus, while the invention has been described by reference to a collector conduit for the crude exhaust gas from a blast furnace, it is applicable to any gas transmission system and particularly to installation in pipes of large cross-sectional area. Accordingly, it will be understood that the present invention has been described by way of illustration and not limitation.

What is claimed is:

1. An isolation valve comprising:
   valve body means, said body means being adapted for rigid connection between a pair of spatially displaced conduits and cooperating with said conduits to define a fluid flow path having an axis, said body means including an extension at one side thereof, said valve body means extension defining a lateral chamber displaced from said fluid flow path, said lateral chamber having an axis which intersects said flow path axis, said valve body means having an annular rim disposed about a first end of said body means, a rigid fluid tight connection being established between said annular rim and the wall of the adjacent conduit section;
   a rotatable control shaft, said control shaft passing through said body means;
   means positioned to the exterior of said body means for imparting rotary motion to said control shaft;
   at least a first valve member disposed within said body means, said first valve member having a sealing surface thereon and defining a liquid receiving and holding vessel which faces in the upstream direction when said valve is closed;
   a valve seat, said seat being supported on said valve body and extending about said flow path, said valve seat being affixed to said annular rim and having a frustoconical plate joined to said rim along a line disposed radially inwardly with respect to said flow path axis from said valve seat, said plate extending downwardly into said vessel whereby a liquid barrier to the fluid being controlled will be established between said valve seat and said flow path upstream of said valve member when said vessel is substantially filled with liquid; and
   means coupling said first valve member to said control shaft whereby rotation of said control shaft will result in said valve member pivoting between a closed position wherein said sealing surface is in contact with said valve seat and an open position wherein said valve member is disposed within said body means lateral chamber.

2. The apparatus of claim 1 wherein the axes of said fluid flow path and said lateral chamber intersect at an angle of less than 90°.

3. The apparatus of claim 1 wherein said valve seat defines an annular groove and wherein said apparatus further comprises:
   a sealing ring, said sealing ring being capable of flexure and being disposed between said valve seat and the sealing surface on said valve member when said valve is in the closed condition, said sealing ring cooperating with the groove defining portions of said valve seat to define an annular chamber through which a coolant may be circulated.

4. The apparatus of claim 3 wherein the axes of said fluid flow path and said lateral chamber intersect at an angle of less than 90°.

5. The apparatus of claim 3 wherein said means for imparting motion to said control shaft comprises:
   a hydraulic actuator having a reciprocal output member and a cylinder defining body, the oppositely disposed ends of said output member and cylinder defining body comprising ends of said actuator;
   means connecting a first end of said actuator to said control shaft, said connecting means converting reciprocal motion to rotary motion;
   a first lever arm, said first lever arm being fixed in position at one end and being oriented generally parallel to said control shaft; and
   means for connecting the second end of said actuator to said first lever arm.

6. The apparatus of claim 1 wherein said valve seat comprises:

a flexible member which cooperates with a sealing surface;

means supporting said flexible member on said valve body means, said supporting means including a generally annular shaped passage; and means for delivering a fluid coolant to said passage.

7. The apparatus of claim 6 wherein the axes of said fluid flow path and said lateral chamber intersect at an angle of less than 90°.

8. The apparatus of claim 1 wherein said means for imparting motion to said control shaft comprises:

a hydraulic actuator having a reciprocal output member and a cylinder defining body, the oppositely disposed ends of said output member and cylinder defining body comprising ends of said actuator;

means connecting a first end of said actuator to said control shaft, said connecting means converting reciprocal motion to rotary motion;

a first lever arm, said first lever arm being fixed in position at one end and being oriented generally parallel to said control shaft; and means for connecting the second end of said actuator to said first lever arm.

9. The apparatus of claim 8 wherein said motion imparting means further comprises:

rod means, said rod means being disposed generally parallelly with said hydraulic actuator, a first end of said rod means being connected to said first lever arm;

bearing means for supporting said control shaft; and means connecting the second end of said rod means to said bearing means.

10. The apparatus of claim 9 wherein the extended position of said actuator output member corresponds to the closed valve condition and wherein said apparatus further comprises:

locking means for mechanically retaining said actuator output member in the extended position to thereby lock said valve in the closed condition.

11. The apparatus of claim 10 wherein said locking means comprises:

a sleeve mounted from and extending about said actuator output member, said sleeve at least partly enveloping said actuator body when said output member is in the retracted position; and a locking member designed for insertion between said sleeve and said actuator body to prevent movement of said sleeve toward said body.

12. The apparatus of claim 11 further comprising:

an adjustment nut mounted on said actuator, said nut cooperating with said locking member to compensate for manufacturing tolerances whereby said valve will remain tightly closed solely under the action of said locking member.

13. The apparatus of claim 12 wherein the axes of said fluid flow path and said lateral chamber intersect at an angle of less than 90°.

14. The apparatus of claim 13 wherein said valve seat defines an annular groove wherein said apparatus further comprises:

a sealing ring, said sealing ring being capable of flexure and being disposed between said valve seat and the sealing surface on said valve member when said valve is in the closed condition, said sealing ring cooperating with the groove defining portions of said valve seat to define an annular chamber through which a coolant may be circulated.

15. The apparatus of claim 13 wherein said valve seat comprises:

a flexible member which cooperates with a sealing surface;

means supporting said flexible member on said valve body means, said supporting means including a generally annular shaped passage; and means for delivering a fluid coolant to said passage.

16. The apparatus of claim 1 wherein said valve body means includes a second extension defining a second lateral chamber having an axis which intersects said flow path axis and wherein said apparatus further comprises:

a second rotatable control shaft, said second control shaft passing through said body means;

means positioned to the exterior of said body means for imparting rotary motion to said second control shaft;

a second valve member disposed within said body means, said second valve member having a sealing surface thereon and being located downstream along said flow path from said first valve member;

a second valve seat, said second seat being supported on said valve body and extending about said flow path; and means coupling said second valve member to said second control shaft whereby rotation of said second control shaft will result in said second valve member pivoting between a closed position wherein its sealing surface is in contact with said second valve seat and an open position wherein said second valve member is disposed within said second lateral chamber.

17. The apparatus of claim 16 wherein the axes of said fluid flow path and said lateral chambers intersect at an angle of less than 90°.

18. The apparatus of claim 17 wherein said valve seats each define an annular groove and wherein said apparatus further comprises:

a pair of sealing rings, said sealing rings being capable of flexure and being disposed between each of said valve seats and the cooperating valve member sealing surface when said valves are in the closed condition, said sealing rings cooperating with the groove defining portions of said valve seats to define annular chambers through which a coolant may be circulated.

19. The apparatus of claim 17 wherein said valve seats each comprise:

a flexible member which cooperates with a sealing surface;

means supporting said flexible member on said valve body means annular rims, said supporting means including a generally annular shaped passage; and means for delivering a fluid coolant to said passage.

20. An isolation valve comprising:

valve body means, said body means being adapted for rigid connection between a pair of spatially displaced conduits and cooperating with said conduits to define a fluid flow path having an axis, said body means including an extension at one side thereof, said valve body means extension defining a lateral chamber displaced from said fluid flow path, said lateral chamber having an axis which intersects said flow path axis;

(a) a rotatable control shaft, said control shaft passing through said body means;

(b) at least a first valve member disposed within said body means, said first valve member having a sealing surface thereon;

(c) a valve seat, said seat being supported on said valve body and extending about said flow path;

(d) means coupling said first valve member to said control shaft whereby rotation of said control shaft will result in said valve member pivoting between a closed position wherein said sealing surface is in contact with said valve seat and an open position wherein said valve member is disposed with said body means lateral chamber;

(e) means positioned to the exterior of said body means for imparting rotary motion to said control shaft including:

(i) a hydraulic actuator having a reciprocal output member and a cylinder defining body, the oppositely disposed ends of said output member and cylinder defining body comprising ends of said actuator;

(ii) means connecting a first end of said actuator to said control shaft, said connecting means converting reciprocal motion to rotary motion;

(iii) a first lever arm, said first lever arm being fixed in position to one end and being oriented generally parallel to said control shaft;

(iv) means for connecting the second end of said actuator to said first lever arm;

(v) rod means, said rod means being disposed generally parallelly with said hydraulic actuator, a first end of said rod means being connected to said first lever arm;

(vi) bearing means for supporting said control shaft;

(vii) means connecting the second end of said rod means to said bearing means;

(viii) wherein the extended position of said actuator output member corresponds to the closed valve condition; and (f) locking means for mechanically retaining said actuator output member in the extended position to thereby lock said valve in the closed position, said locking means comprising:

(i) a sleeve mounted from and extending about said actuator output member, said sleeve at least partly enveloping said actuator body when said output member is in the retracted position; and (ii) a locking member designed for insertion between said sleeve and said actuator body to prevent movement of said sleeve toward said body.

21. The apparatus of claim 20 further comprising:
an adjustment nut mounted on said actuator, said nut cooperating with said locking member to compensate for manufacturing tolerances whereby said valve will remain tightly closed solely under the action of said locking member.

22. The apparatus of claim 21 wherein the axes of said fluid flow path and said lateral chamber intersect at an angle of less than 90°.

23. The apparatus of claim 22 wherein said valve body means further comprises:
an annular rim disposed about a first end of said body means, a rigid fluid tight connection being established between said annular rim and the wall of the adjacent conduit section, said valve seat being affixed to said annular rim.

24. The apparatus of claim 23 wherein said valve seat defines an annular groove and wherein said apparatus further comprises:
a sealing ring, said sealing ring being capable of flexure and being disposed between said valve seat and the sealing surface on said valve member when said valve is in the closed condition, said sealing ring cooperating with the groove defining portions of said valve seat to define an annular chamber through which a coolant may be circulated.

25. The apparatus of claim 24 wherein said valve member defines a liquid receiving and holding vessel which faces in the upstream direction when said valve is closed and wherein said body means further comprises:
a frustoconical plate joined to said rim along a line disposed radially inwardly with respect to said flow path axis from said valve seat, said plate extending downwardly into said vessel whereby a liquid barrier to the fluid being controlled will be established between said valve seat and said flow path upstream of said valve member when said vessel is substantially filled with liquid.

26. The apparatus of claim 23 wherein said valve seat comprises:
a flexible member which cooperates with a sealing surface;
means supporting said flexible member on said valve body means, said supporting means including a generally annular shaped passage; and
means for delivering a fluid coolant to said passage.

27. The apparatus of claim 26 wherein said valve member defines a liquid receiving and holding vessel which faces in the upstream direction when said valve is closed and wherein said body means further comprises:
a frustoconical plate joined to said rim along a line disposed radially inwardly with respect to said flow path axis from said valve seat, said plate extending downwardly into said vessel whereby a liquid barrier to the fluid being controlled will be established between said valve seat and said flow path upstream of said valve member when said vessel is substantially filled with liquid.

28. An isolation valve for adaption for rigid connection between a pair of spatially displaced conduits to define a fluid flow path comprising:

(a) a valve body adaptable for connection between said conduits and including an extension at one side thereof which defines a chamber displaced from said fluid flow path;

(b) a rotatable control shaft passing through said valve body and supported by at least one bearing which is supported on said valve body;

(c) at least one valve disposed within said valve body and having a sealing surface thereon;

(d) a valve seat supported on said valve body and providing a seat for said valve;

(e) first lever means coupling said valve to said control shaft whereby rotation of said shaft will result in said valve pivoting between a closed and an open position; and (f) means for rotating said control shaft including:
(i) a hydraulic actuator having first and second ends,
(ii) second lever means connecting the first end of said hydraulic actuator to said control shaft, said second lever means allowing for conversion of reciprocal motion to rotary motion, (iii) a lever arm being pivotally fixed in position at one end and being oriented generally parallel to said control shaft, said second end of said actuator being connected to said lever arm, and (iv) a rod having one end connected to said lever arm, the other end of said rod being connected to said bearing to provide tractional support for said bearing when a load is imposed on said valve, the rod being connected to said lever arm at a position intermediate the pivot position of the lever arm and the connection between the lever arm and the hydraulic actuator.

29. An isolation valve according to claim 28 wherein said first lever means has a length, $l_1$, defined by the distance between the control shaft and the valve; the second lever means has a length, $l_2$, defined by the distance between the connection of the hydraulic actuator and the control shaft; the distance between the pivot of the lever arm and the connection between the lever arm and the rod being a predetermined distance, B; the distance between the connection between the lever arm and the rod and the actuator and the lever arm being a predetermined distance, A; and wherein the ratio of $l_1/l_2$ is approximately equal to the ratio of B/A.

30. An isolation valve comprising:

valve body means, said body means being adapted for rigid connection between a pair of spatially displaced conduits and cooperating with said conduits to define a fluid flow path having an axis, said body means including an extension at one side thereof, said valve body means extension defining a lateral chamber displaced from said fluid flow path, said lateral chamber having an axis which intersects said flow path axis, said valve body means having an annular rim disposed about a first end of said body means, a rigid fluid tight connection being established between said annular rim and the wall of the adjacent conduit section;

a rotatable control shaft, said control shaft passing through said body means;

means positioned to the exterior of said body means for imparting rotary motion to said control shaft;

at least a first valve member disposed within said body means, said first valve member having a sealing surface thereon, said sealing surface defining protrusion means;

a u-shaped valve seat, said seat being supported on said valve body and extending about said flow path, said valve seat being affixed to said annular rim and defining an annular groove and two walls;

means coupling said first valve member to said control shaft whereby rotation of said control shaft will result in said valve member pivoting between a closed position wherein said sealing surface is in contact with said valve seat and an open position wherein said valve member is disposed within said body means lateral chamber; and a sealing ring, said sealing ring having an annular shape, said sealing ring being capable of flexure and being disposed between said valve seat and the sealing surface on said valve member when said valve is in the closed condition, said sealing ring spanning the annular groove of said valve seat to define an annular chamber through which a coolant may be circulated and said protrusion means imposing pressure on the sealing ring between the walls of the u-shaped valve seat to flex the sealing ring.

31. An isolation valve in a fluid conduit comprising:

a cylindrical fluid conduit which provides a cylindrical valve body, said fluid conduit connected integrally between a pair of spatially displaced conduits to define a fluid flow path having an axis, said valve body including a cylindrical extension at one side thereof, said extension defining a lateral chamber displaced from said fluid flow path, said lateral chamber having an axis which intersects said flow path axis at an angle in the range of 75° to 80°, the intersection of the lateral chamber and the fluid conduit defining a valve member receiving aperture having a maximum width corresponding to the axis of the lateral chamber;

a rotatable control shaft, said control shaft passing through said valve body;

means positioned to the exterior of said valve body for imparting rotary motion to said control shaft;

at least a first generally circular valve member disposed within said body means, said first valve member having a sealing surface thereon and defining a center;

a valve seat, said seat being supported on said valve body and extending about said flow path; and means coupling said first valve member to said control shaft whereby rotation of said control shaft will result in said valve member pivoting between a closed position wherein said sealing surface is in contact with said valve seat and an open position wherein said valve member is disposed entirely within said lateral chamber, the trojectory of the center of the valve member does not vary by any appreciable distance from the axis of the lateral chamber when the valve member enters the lateral chamber via the receiving aperture to thereby allow for the use of a lateral chamber having a relatively small inner diameter.

32. The apparatus of claim 31 wherein said valve body means further comprises:

an annular rim disposed about a first end of said valve body, a rigid fluid tight connection being established between said annular rim and the wall of the adjacent conduit section, said valve seat being affixed to said annular rim.

33. The apparatus of claim 32 wherein said valve seat defines an annular groove and wherein said apparatus further comprises:

a sealing ring, said sealing ring being capable of flexure and being disposed between said valve seat and the sealing surface on said valve member when said valve is in the closed condition, said sealing ring cooperating with the groove defining portions of said valve seat to define an annular chamber through which a coolant may be circulated.

34. The apparatus of claim 32 wherein said valve seat comprises:

a flexible member which cooperates with a sealing surface;

means supporting said flexible member on said valve body means, said supporting means including a generally annular shaped passage; and means for delivering a fluid coolant to said passage.

35. The apparatus of claim 32 wherein said valve member defines a liquid receiving and holding vessel which faces in the upstream direction when said valve is closed and wherein said valve body further comprises:

a frustoconical plate joined to said rim along a line disposed radially inwardly with respect to said flow path axis from said valve seat, said plate extending downwardly into said vessel whereby a liquid barrier to the fluid being controlled will be established between said valve seat and said flow path upstream of said valve member when said vessel is substantially filled with liquid.

* * * * *